United States Patent [19]

Krüger et al.

[11] Patent Number: 5,696,216
[45] Date of Patent: Dec. 9, 1997

[54] PEROXIDE CROSSLINKABLE FLUORORUBBERS, A PROCESS FOR THE PRODUCTION THEREOF AND USE THEREOF

[75] Inventors: Ralf Krüger, Köln; Govert Woeste, Düsseldorf, both of Germany; Tatyana Alexandrovna Filchakova, St. Petersburg, Russian Federation; Alexandr Nikolaevich Kollar, St. Petersburg, Russian Federation; Sergey Vasilyevich Sokolov, St. Petersburg, Russian Federation; Mark Peysakhovich Greenblat, St. Petersburg, Russian Federation; Nikolay Vladimirovich Veretennikov, St. Petersburg, Russian Federation

[73] Assignee: Bayer Aktiengesellschaft, Leverkusen, Germany

[21] Appl. No.: 747,736

[22] Filed: Nov. 12, 1996

[30] Foreign Application Priority Data

Nov. 15, 1995 [DE] Germany .................. 195 42 501.4

[51] Int. Cl.$^6$ ..................................................... C08F 16/24
[52] U.S. Cl. .............................................. 526/247; 526/206
[58] Field of Search ..................................... 526/247, 206

[56] References Cited

U.S. PATENT DOCUMENTS

| | | |
|---|---|---|
| 3,321,532 | 5/1967 | Lorenz . |
| 3,326,984 | 6/1967 | Anderson et al. . |
| 3,450,684 | 6/1969 | Darby . |
| 3,692,843 | 9/1972 | Resnick . |
| 3,851,018 | 11/1974 | Kelly . |
| 4,035,565 | 7/1977 | Apotheker et al. . |
| 4,418,186 | 11/1983 | Yamabe et al. . |
| 4,487,903 | 12/1984 | Tatemoto et al. . |
| 4,613,636 | 9/1986 | Ojakaar . |
| 4,619,983 | 10/1986 | Yamabe et al. . |
| 4,943,622 | 7/1990 | Naraki et al. . |
| 4,973,634 | 11/1990 | Logothetis . |
| 5,001,278 | 3/1991 | Oka et al. . |
| 5,173,553 | 12/1992 | Albano et al. . |
| 5,214,115 | 5/1993 | Langstein et al. . |
| 5,225,504 | 7/1993 | Tatsu et al. . |
| 5,247,036 | 9/1993 | Krüger et al. . |
| 5,260,392 | 11/1993 | Arcella et al. . |
| 5,260,393 | 11/1993 | Arcella et al. . |
| 5,349,093 | 9/1994 | Oka et al. . |

FOREIGN PATENT DOCUMENTS

| | | |
|---|---|---|
| 0055407 | 7/1982 | European Pat. Off. . |
| 0290848 | 11/1988 | European Pat. Off. . |
| 5295038 | 11/1993 | Japan . |
| 1496084 | 12/1977 | United Kingdom . |
| 9220743 | 11/1992 | WIPO . |

*Primary Examiner*—Joseph L. Schofer
*Assistant Examiner*—N. Sarofim
*Attorney, Agent, or Firm*—Sprung Kramer Schaefer & Briscoe

[57] ABSTRACT

The present invention relates to peroxide crosslinkable fluororubbers prepared from polymerized units of vinylidene fluoride, at least one fluorinated propene and/or a fluorinated methyl vinyl ether, at least one perfluoro(polyoxaalkyl vinyl ether), optionally tetrafluoroethylene and crosslinking-active reactive sites, to a process for the production thereof and to the use thereof.

10 Claims, No Drawings

PEROXIDE CROSSLINKABLE FLUORORUBBERS, A PROCESS FOR THE PRODUCTION THEREOF AND USE THEREOF

The present invention relates to peroxide crosslinkable fluororubbers prepared from polymerized units of vinylidene fluoride, at least one fluorinated propene and/or a fluorinated methyl vinyl ether, at least one perfluoro-(polyoxaalkyl vinyl ether), optionally tetrafluoroethylene, and crosslinking-active reactive sites, to a process for the production thereof and to the use thereof.

As is known, fluororubbers based on vinylidene fluoride (VDF), hexafluoropropene (HFP) and optionally tetrafluoroethylene (TFE) have good swelling and ageing characteristics in applications at temperatures of up to well in excess of 200° C. However, they have unsatisfactory elastic properties in the low temperature range. The glass transition temperatures of the said peroxide crosslinkable fluororubbers are between 0° C. and, in the most favorable case, $-20°$ C.

However, for many applications, the critical application threshold is at temperatures of $-30°$ C. and below.

Great efforts have thus been made to improve the low temperature flexibility of fluoroelastomers.

One known method is the partial or complete replacement of HFP with perfluoro-(alkyl vinyl ether) units ($CF_2$=CF—O—$R_F$), wherein RF may, for example, be a perfluorinated alkyl residue, such as —$CF_3$, —$C_2F_5$ or —$C_3F_7$. References which may be cited in this connection are patents DE-A 1 240 670, DE-A 2 457 102, EP-A 525 685, EP-A 525 687, FR 2 347 389 and U.S. Pat. No. 4,035,565.

However, even the greatest possible content of copolymerized units of these costly perfluoro(alkyl vinyl ethers) does not bring about a reduction in glass transition temperature ($T_g$) in the peroxide crosslinkable fluororubber which is sufficient for the above-stated purposes.

Instead of these perfluoro(alkyl vinyl ethers), it is possible to use perfluoro(vinyl ether) units containing more than one ether linkage, so-called perfluoro-(polyoxaalkyl vinyl ether) units, as these have a more pronounced action with regard to improving the low temperature flexibility of fluororubbers. Unbranched perfluoro-(polyoxaalkyl vinyl ether) units are here more effective in reducing $T_g$ than branched units. References which may be cited for fluororubbers containing such perfluoro(polyoxa-alkyl vinyl ether) units are patents EP-A 0 077 998 and EP-A 0 290 848.

Since, according to the prior art, the costly perfluoro-(polyoxaalkyl vinyl ether) units must be present in the fluororubbers in very high proportions relative to the complete fluororubber, the production costs for such fluororubbers with excellent low temperature characteristics are very high. Moreover, the poor copolymerizability of VDF or TFE with the perfluoro(polyoxaalkyl vinyl ether) units results either in long reaction times or in low yields. Patents EP-A 0 077 998 and EP-A 0 290 848 may again be cited in this connection.

The object of the present invention is thus to provide peroxide crosslinkable fluororubbers which, in contrast with the prior art (VDF/HFP/TFE rubbers), exhibit a significant reduction in glass transition temperatures while using only a small possible quantity of costly modifying comonomer structural units.

It surprisingly proved possible to achieve this object with peroxide crosslinkable fluororubbers containing as polymerized units certain proportions of at least one fluorinated propene and/or fluorinated methyl vinyl ether, at least one perfluoro-(polyoxaalkyl vinyl ether) unit of the formula (I)

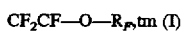

where $R_F$=—$(CF_2)_m$(—O—$CF_2)_n$—O—$CF_3$;
where m=3 and n=0
or m=2 and n=1–4
or $R_F$=—$(CF_2$—$CF_2$—O)$_p$—$C_nF_{2q+1}$;
where p=1–4 and q=1 or 2, vinylidene fluoride and optionally tetrafluoroethylene together with crosslinking-active reactive sites.

The present invention accordingly provides peroxide crosslinkable fluororubbers having crosslinking-active reactive sites and containing polymerized units of vinylidene fluoride, optionally tetrafluoroethylene, at least one fluorinated propene and/or methyl vinyl ethers and at least one perfluoro(polyoxaalkyl vinyl ether), characterised in that these rubbers contain a) 65–82 mol. % of vinylidene fluoride,
b) 0–12 mol. % of tetrafluoroethylene,
c) 12–23 mol. % of at least one fluorinated propene and/or fluorinated methyl vinyl ether,
d) 0.3–6 mol. % of at least one perfluoro(polyoxaalkyl vinyl ether) of the formula (I)

$$CF_2=CF—O—R_F \qquad (I),$$

wherein $R_F$=—$(CF_2)_m$(—O—$CF_2)_n$—O—$CF_3$ where m=3 and n=0 or m=2 and n=1–4;

or wherein $R_F$=—$(CF_2$—$CF_2$—O)$_p$—$C_nF_{2q}$+1 where p=1–4 and q=1 or 2 and e) 0.1–1.0 mol. % of crosslinking-active reactive sites, wherein the sum of all the components is 100 mol. %.

In a preferred embodiment of the invention, the peroxide crosslinkable fluororubbers contain no tetrafluoroethylene. In another preferred embodiment of the invention, the fluororubbers according to the invention contain 5–12 mol. % of tetrafluoroethylene.

For the purposes of the invention, fluorinated propenes c) are preferably compounds of the formula $C_3H_nF_{6-n}$ where n=0–5, particularly preferably hexafluoropropene together with 1-hydro- and 2-hydropentafluoropropene. Fluorinated methyl vinyl ethers c) for the purposes of the invention are preferably compounds of the formula $C_3H_nF_{6-n}O$ where n=0–3, particularly preferably methyltrifluorovinyl ether, trifluoromethyl vinyl ether and perfluoromethyl vinyl ether.

Component c) is particularly preferably at least one compound from the group comprising hexafluoropropene, pentafluoropropene and/or perfluoromethyl vinyl ether.

For the purposes of the invention, perfluoro(polyoxaalkyl vinyl ethers) d) are compounds of the formula (I)

$$CF_2=CF—O—R_F \qquad (I),$$

wherein $R_F$=—$(CF_2)_m$(—O—$CF_2)_n$—O—$CF_3$ where m=3 and n=0 or m=2 and n=1–4, wherein the combinations m=2 and n=1–4 and m=3 and n=0 is preferred, or wherein $R_F$=—$(CF_2$—$CF_2$—O)$_p$—$C_nF_{2q}$+1 where p=1–4 and q=1 or 2, preferably p=1–4 and q=1.

Formula I thus includes compounds of the formulae $CF_2=CF—O—(CF_2)_m—OCF_3$ where m=3 and with n=0 (Ia)

$CF_2=CF—O—CF_2—CF_2—(OCF_2)_n—OCF_3$ where n=1–4 and with m=2 (Ib)

$CF_2=CF—O—(CF_2O)_p—CF_3$ where p=1–4 and with n=1 and (Ic)

$CF_2=CF-O-(CF_2-CF_2O)_p-CF_2-CF_3$ where p=1–4 and with n=2  (Id).

Compounds of the formulae (Ia) and (Ib) are particularly preferred as component d). Reference is made to U.S. Pat. No. 3,321,532, U.S. Pat. No. 3,326,984, U.S. Pat. No. 3,450,684, U.S. Pat. No. 3,692,843 and EP-A 290 848 in relation to the production of the perfluoro-(polyoxaalkyl vinyl ethers) of the formula (I).

For the purposes of the invention, crosslinking-active reactive sites e) are preferably C=C double bonds and/or bromine or iodine residues introduced by polymerization in the presence of compounds containing at least two C=C double bonds, such as for example triallyl isocyanurate, or, as described in U.S. Pat. No. 5,247,036 or U.S. Pat. No. 5,214,115 and/or olefins and/or saturated compounds containing bromine and/or iodine, such as for example bromotrifluoroethylene, bromotetrafluorobutene, difluorobromoethylene, perfluoro-(2-bromoethyl vinyl ether) and diiodomethane or compounds as described in DE-A 4 023 657, U.S. Pat. No. 4,943,622, EP-A 208 314 or U.S. Pat. No. 4,973,634, and/or introduced as described in DE 4 440 201.5 or DE 19 530 636.8.

In a preferred embodiment of the invention, the peroxide crosslinkable fluororubbers contain
a) 70–82 mol. % of vinylidene fluoride,
b) 0–12 mol. % of tetrafluoroethylene,
c) 16–23 mol. % of at least one fluorinated methyl vinyl ether,
d) 0.3–5 mol. % of at least one perfluoro-(polyoxaalkyl vinyl ether) of the formula (I)

$CF_2=CF-O-R_F$  (I), wherein $R_F=-(CF_2)_m(-O-CF_2)_n-O-CF_3$ where m=3 and n=0 or m=2 and n=1–4;
or wherein $R_F=-(CF_2-CF_2-O)_m-CF_3$ where m=1–4, preferably $R_F=-(CF_2)_m(-O-CF_2)_n-O-CF_3$ where m=3 and n=0 or m=2 and n=1–4, and
e) 0.1–1.0 mol. % of crosslinking-active reactive sites.

In another preferred embodiment of the invention, the peroxide crosslinkable fluororubbers contain
a) 65–82 mol. % of vinylidene fluoride,
b) 0–12 mol. % of tetrafluoroethylene,
c) 12–20 mol. % of at least one fluorinated propene,
d) 1–6 mol. % of at least one perfluoro-(polyoxaalkyl vinyl ether) of the formula (I)

$CF_2=CF-O-R_F$  (I), wherein $RF=-(CF_2)_m(-O-CF_2)_n-O-CF_3$ where m=3 and n=0 or m=2 and n=1–4;
or wherein $RF=-(CF_2-CF_2-O)_m-CF_3$ where m=1–4, preferably $R_F=-(CF_2)_m(-O-CF_2)_n-O-CF_3$ where m=3 and n=0 or m=2 and n=1–4, and
e) 0.1–1.0 mol. % of crosslinking-active reactive sites. The Mooney viscosity ($ML_{1+10}$ at 120° C.) according to ASTM-D is preferably $\leq 120$.

The present invention also provides a process for the production of the peroxide crosslinkable fluororubbers according to the invention, in accordance with which components a), c) to e) and optionally b) are free-radically copolymerized in solution, suspension or emulsion at 0° C. to 120° C. under elevated pressure.

In a preferred embodiment of the process according to the invention, components a), c) to e) and optionally b) are copolymerized in an aqueous dispersion in the presence of perfluorinated emulsifiers with a free radical initiator system at temperatures of 20° to 80° C. and a pressure of $\geq 2$ bar.

The fluororubbers according to the invention may be produced using known polymerization methods, such as bulk, solution and emulsion polymerization is preferred. Production using the method of aqueous emulsion polymerization is preferred. The dispersion is stabilized using solely emulsifiers containing fluorine, solely a seed latex or a mixture consisting of a seed latex and fluorinated emulsifiers. Perfluorinated emulsifiers are preferably used, such as for example water soluble salts of $C_6$–$C_{12}$ perfluorocarboxylic or perfluorosulphonic acid or perfluoroalkylcarboxylic acids based on hexafluoropropylene oxide oligomers. Compounds which may be cited by way of example are the sodium or ammonium salts of perfluorooctanoic acid and of perfluoro-(2,5-dimethyl-3,6-dioxanonanoic acid) and the lithium salt of perfluorooctylsulphonic acid. The emulsifiers are preferably used at a concentration of 0.05 to 2 wt. %, particularly preferably of 0.1 to 1.5 wt. %, relative to the aqueous phase. The emulsifier may be added to the liquor before polymerization begins or may also optionally be continuously apportioned over the period of the polymerization process. If a seed latex is used, it consists of fluoropolymer particles having an average particle size of $\leq 60$ nm and stabilized with one or more of the stated emulsifiers.

The free radical copolymerization is preferably initiated using known compounds suitable for the reaction medium in question. It is thus preferred, for solution and suspension polymerization, to use organic, oil-soluble peroxides, which may also be fluorinated, such as benzoyl peroxide, trifluoroacetyl peroxide or organic soluble azo compounds, such as azoisobutyronitrile. In the case of emulsion polymerization, which is preferred for production of the peroxide crosslinkable fluororubbers according to the invention, water soluble per compounds are used as initiators, such as persulphates, perborates, percarbonates etc., generally in the form of the sodium or ammonium salts thereof.

Depending upon the polymerization temperature and the decay constant of the initiator, decay accelerators, generally reducing agents, are additionally used when polymerization is performed at low temperatures. Examples of compounds which may be used for this purpose are: sulphur compounds, such as sodium sulphite, sodium pyrosulphite or Rongalite C (sodium formamidinesulphinic acid), together with organic reducing agents, such as ascorbic acid, metal salts, such as iron(II) or cobalt(II) salts, organometallic compounds etc.

It is also possible to use an initiator system consisting of at least one manganese compound or a mixture of two or more manganese compounds having an oxidation number of $\geq 3$ and optionally a reducing agent, such as for example carboxylic acids, dicarboxylic acids, polyhydric alcohols and hydroxycarboxylic acids.

Reaction temperatures for the copolymerization are between 0° and +120° C., preferably 20° to 80° C. Polymerization temperature is dependent upon the reactivity of the comonomers used and upon the desired properties of the peroxide crosslinkable fluororubbers according to the invention which are to be produced.

Copolymerization is preferably performed under elevated pressure. This pressure should be at least 2 bar, but need not exceed a value of 100 bar. The selected pressure depends upon the desired rate of polymerization and upon the desired content of the individual components, since the solubility and thus the incorporation ratio thereof may be adjusted by means of the pressure used.

In order to adjust the molecular weight of the resultant fluororubbers according to the invention, it is, if necessary, possible to use chain-transfer agents, such as methanol, isopropanol, isopentane, ethyl acetate, diethyl malonate, carbon tetrachloride together with substances containing iodine, bromine and iodine/bromine.

The fluororubbers according to the invention may be produced batchwise, but preferably using semi-continuous or continuous processes.

The fluororubbers according to the invention may be free-radically crosslinked using conventional methods. Free radical initiators which are preferably used are peroxides having decomposition half-lives of at least 5 minutes at temperatures of above 100° C., such as for example dibenzoyl peroxide, t-butylperoxybenzene, bis-(t-butylperoxyisopropyl)benzene, 2,5-bis-(t-butylperoxy)-2,5-dimethylhexane or 2,5-bis-(t-butylperoxy)-2,5-dimethylhex-3-yne.

The peroxides are here preferably added in a quantity of 0.5–10 parts by weight, particularly preferably of 1–5 parts by weight, relative to 100 parts of the fluororubbers according to the invention.

It is possible to add additional co-curing agents, especially in the case of pressure curing, in order to achieve better vulcanization and mechanical properties. Many compounds having two or more double bonds may be used as co-curing agents, such as for example triallyl cyanurate, triallyl isocyanurate, tri(meth)allyl isocyanurate, tetramethyl tetravinyl tetrasiloxane, triallyl phosphite and N,N'-m-phenylene-bismaleimide, which are present in quantities of preferably 0.1–15, particularly preferably of 0.5–10 parts by weight, relative to 100 parts of the fluororubbers according to the invention.

The vulcanizable mixture may also contain as acid acceptors oxides or hydroxides of metals, such as for example magnesium, calcium, lead, zinc and barium or at least one basic salt with an organic acid residue, such as sodium acetate, magnesium oxalate or carbonates or basic lead phosphate or a combination thereof in proportions of no more than 15 parts by weight, relative to 100 parts of the fluororubber according to the invention.

It is possible to add further known fillers, reinforcing materials, plasticizers, lubricants, processing aids, pigments, or the like.

Incorporation of the above-stated mixture constituents into the peroxide crosslinkable fluororubbers according to the invention proceeds using known mixing methods, for example in a roll mill or internal kneader.

Vulcanization generally proceeds in a first stage under pressure at 120° to 200° C. to produce a dimensionally stable shape, which is then post-vulcanized in a circulating air oven in order to establish final properties.

The fluororubbers according to the invention may be processed to yield crosslinked linked moldings using conventional methods, such as for example injection molding, transfer moulding or compression molding.

The present invention also extends to the use of the fluororubbers according to the invention for the production of industrial robber articles, such as seals, hoses and o-rings.

The following examples illustrate the invention without limiting its scope.

PRACTICAL EXAMPLES

Example 1

447 g of distilled water, 5 g of $C_3F_7OCF(CF_3)CF_2OCF(CF_3)COONH_4$ as emulsifier and 1.0 g of $(NH_4)_2S_2S_2O_8$ and 0.12 g of $Na_2S_2O_5$ as initiator were introduced into an evacuated and argon-flushed reaction vessel of a capacity of 1 liter. A monomer mixture consisting of 76.3 g of VDF, 59.4 g of perfluoromethyl vinyl ether, 1.1 g of 1,1-difluorobromoethylene and 13.2 g of $CF_2=CF-O-CF_2-CF_2-(O-CF_2)_2-O-CF_3$ in molar proportions of 75.0:22.5:0.5:2.0 mol. % was introduced into a storage tank in such a manner that the pressure in the storage vessel was 40–100 bar at 20°–25° C. A quantity of the monomer mixture was transferred via an outlet in the bottom of the storage tank into the reaction vessel such that the pressure in the reaction vessel was 3 bar. The reaction mixture was heated to 50° C. and the pressure adjusted to 10 to 11 bar by introducing more of the above-stated monomer mixture. The pressure, which fell once the reaction had begun, was readjusted to 10 to 11 bar by periodically introducing more of the above-stated monomer mixture until it had been completely consumed. After a reaction time of 17 hours, the reaction mixture was cooled to 20° C. and 50 g of an aqueous solution containing 3 wt. % of $NaNO_2$ were added to terminate the reaction. After a further 3 to 5 minutes' stirring, the mixture was degassed and the resultant latex coagulated by freezing or by adding a 2% calcium chloride solution. The mixture was then filtered, the polymer washed with hot water and finally dried at 70° C. and standard pressure (95% yield). According to $^{19}F$-NMR spectroscopy, the polymer product contained units of the monomers VDF::perfluoromethyl vinyl ether:1,1-difluorobromoethylene:$CF_2=CF-O-CF_2-CF_2-(O-CF_2)-O-CF_3$ in proportions of 78.7:19.2:0.4:1.7 mol. %. The [η] value was determined in hexafluorobenzene as solvent at a temperature of 25° C. and was 0.62 dl/g. Mooney viscosity was determined to ASTM-D 1646 at 100° C. The value was 71 after 10 minutes.

In order to determine glass transition temperature, a cylindrical specimen was cooled at a rate of 5 K/min to 10–20 K below the expected glass transition temperature under the action of a static weight. After 10 minutes' waiting, the weight was removed and the specimen heated at a rate of 1 K/min, wherein temperature and elongation were recorded. The glass transition temperature, i.e. the temperature at which uniform deformation began, was −39° C.

A peroxide crosslinkable mixture was produced on a roll mill from the polymer with the following substances, wherein the stated quantities (parts by weight) relate to 100 parts by weight of polymer: 30 parts of carbon black T 900, 4 parts of calcium hydroxide, 2 parts of triallyl isocyanurate and 5 parts of Peroximon (mixture of 1,3-bis-(tert.-butylperoxyisopropyl)benzene and 1,4-bis-(tert.-butylperoxyisopropyl)-benzene). The resultant mixture was compressed for 10 minutes at a temperature of 170° C. at a pressure of at least 59 bar, then demolded while hot and cooled to 25° C. After at least 6 hours' storage at 25° C., the specimens were then post-cured in a circulating air oven after a heating time of 30 minutes for 60 minutes at 100° C., after a further heating time of 30 minutes for 30 minutes at 150° C., after a further heating time of 30 minutes for 30 minutes at 200° C. and after a further heating time of 30 minutes for 24 hours at 250° C. The specimens were stored for at least 6 hours at 25° C. before all the remaining tests. Tensile stress/elongation was measured to ASTM D-412 and revealed a tensile strength of 11.8 MPa and an elongation at break of 170%. In order to determine the compression set, a cylindrical specimen (diameter and height each 10 mm) was compressed to 20% at 200° C. for 24 hours and then stored for 30 minutes at 25° C. The compression set was then determined at 21%.

Example 2

450 g of distilled water, 2.5 g of $C_3F_7OCF(CF_3)CF_2OCF(CF_3)COONH_4$ as emulsifier and 0.4 g of $(NH_4)_2S_2O_8$ and 0.08 g of $Na_2S_2O_5$ as initiator were introduced into an evacuated and argon-flushed reaction vessel of a capacity of 1 liter. A monomer mixture consisting of 77.5 g of VDF, 63.3 g of perfluoromethyl vinyl ether, 0.9 g of 1,1-difluorobromoethylene and 8.3 g of $CF_2$=$CF$—$O$—$(CF_2$—$CF_2$—$O)_3$—$CF_3$ in molar proportions of 75.0:23.6:0.4:1.0 mol. % was then unanswered from a storage tank as described in Example 1 to give a pressure of 3 bar. The reaction mixture was heated to 50° C. and the pressure adjusted to 10 to 11 bar by introducing more of the above-stated monomer mixture. The pressure, which fell once the reaction had begun, was readjusted to 10 to 11 bar by periodically introducing more of the above-stated monomer mixture until it had been completely consumed. After a reaction time of 28 hours, the reaction mixture was cooled to 20° C. and 50 g of an aqueous solution containing 3 wt. % of $NaNO_2$ were added to terminate the reaction. After a further 3 to 5 minutes' stirring, the mixture was degassed and the resultant latex coagulated by freezing or by adding a 2% calcium chloride solution. The mixture was then filtered, the polymer washed with hot water and finally dried at 70° C. and standard pressure (83% yield). According to $^{19}$F-NMR spectroscopy, the product contained the monomers VDF:perfluoromethyl vinyl ether:1,1-difluorobromoethylene:$CF_2$=$CF$—$O$—$(CF_2$—$CF_2$—$O)_3$—$CF_3$ in proportions of 79.2:20.1:0.3:0.4 mol. %. The [η] value was 0.52 dl/g, the Mooney viscosity (at 100° C.) was 71 and the glass transition temperature −37° C.

As described in Example 1, a mixture was produced from the polymer and vulcanized. The specimen exhibited a tensile strength of 14.0 MPa and an elongation at break of 180%. The compression set was 18%.

Comparative Example 1 (to Examples 1 and 2)

447 g of distilled water, 2.5 g of $C_3F_7OCF(CF_3)CF_2OCF(CF_3)COONH_4$ as emulsifier and 1.25 g of $(NH_4)_2S_2O_8$ and 0.15 g of $Na_2S_2O_5$ as initiator were introduced into an evacuated and argon-flushed reaction vessel of a capacity of 1 liter. A monomer mixture consisting of 80.6 g of VDF, 68.2 g of perfluoromethyl vinyl ether and 1.2 g of 1,1-difluorobromoethylene in molar proportions of 75.0:24.5:0.5 mol. % was then transferred from a storage tank as described in Example 1 to give a pressure of 3 bar. The reaction mixture was heated to 52° C. and the pressure adjusted to 10 to 11 bar by introducing more of the above-stated monomer mixture. The pressure, which fell once the reaction had begun, was readjusted to 10 to 11 bar by periodically introducing more of the above-stated monomer mixture until it had been completely consumed. After a reaction time of 11 hours, the reaction mixture was cooled to 20° C. and 50 g of an aqueous solution containing 3 wt. % of $NaNO_2$ were added to terminate the reaction. After a further 3 to 5 minutes' stirring, the mixture was degassed and the resultant latex coagulated by freezing or by adding a 2% calcium chloride solution. The mixture was then filtered, the polymer washed with hot water and finally dried at 70° C. and standard pressure (92% yield). According to $^{19}$F-NMR spectroscopy, the product contained the monomers VDF:perfluoromethyl vinyl ether:1,1-difluorobromoethylene in proportions of 76.9:22.7:0.4 mol. %. The [η] value was 0.55 dl/g, the Mooney viscosity (at 100° C.) was 75 and the glass transition temperature −35° C.

As described in Example 1, a mixture was produced from the polymer and vulcanized. The specimen exhibited a tensile strength of 14.0 MPa and an elongation at break of 190%. The compression set was 28%.

Example 3

456 g of distilled water, 5 g of $C_3F_7OCF(CF_3)CF_2OCF(CF_3)COONH_4$ as emulsifier and 1.25 g of $(NH_4)_2S_2O_8$ and 0.12 g of $Na_2S_2O_5$ as initiator were introduced into an evacuated and argon-flushed reaction vessel of a capacity of 1 liter. A monomer mixture consisting of 77.1 g of VDF, 51.8 g of HFP, 1.2 g of 1,1-difluorobromoethylene and 20.0 g of $CF_2$=$CF$—$O$—$CF_2$—$CF_2$—$(O$—$CF_2)$—$O$—$CF_3$ in molar proportions of 75.0:21.5:0.5:3.0 mol. % was then transferred from a storage tank as described in Example 1 to give a pressure of 3 bar. The reaction mixture was heated to 50° C. and the pressure adjusted to 10 to 11 bar by introducing more of the above-stated monomer mixture. The pressure, which fell once the reaction had begun, was readjusted to 10 to 11 bar by periodically introducing more of the above-stated monomer mixture until it had been completely consumed. After a reaction time of 24 hours, the reaction mixture was cooled to 20° C. and 50 g of an aqueous solution containing 3 wt. % of $NaNO_2$ were added to terminate the reaction. After a further 3 to 5 minutes' stirring, the mixture was degassed and the resultant latex coagulated by freezing or by adding a 2% calcium chloride solution. The mixture was then filtered, the polymer washed with hot water and finally dried at 70° C. and standard pressure (93% yield). According to $^{19}$F-NMR spectroscopy, the product contained the monomers VDF:HFP:1,1-difluorobromoethylene:$CF_2$=$CF$—$O$—$CF_2$—$CF_2$—$(O$—$CF_2)_2$—$O$—$CF_3$ in proportions of 78.7:18.7:0.3:2.3 mol. %. The [η] value was 0.48 dl/g, the Mooney viscosity (at 100° C.) was 73 and the glass transition temperature −35° C.

As described in Example 1, a mixture was produced from the polymer and vulcanized. The specimen exhibited a tensile strength of 13.0 MPa and an elongation at break of 160%. The compression set was 15%.

Comparative Example 2 (to Example 3)

445 g of distilled water, 2.5 g of $C_3F_7OCF(CF_3)CF_2OCF(CF_3)COONH_4$ as emulsifier and 1.25 g of $(NH_4)_2S_2O_8$ as initiator were introduced into an evacuated and argon-flushed reaction vessel of a capacity of 1 liter. A monomer mixture consisting of 84.2 g of VDF, 64.5 g of HFP and 1.3 g of 1,1-difluorobromoethylene ethylene in molar proportions of 75.0:24.5:0.5 mol. % was then transferred from a storage tank as described in Example 1 to give a pressure of 3 bar. The reaction mixture was heated to 60° C. and the pressure adjusted to 10 to 11 bar by introducing more of the above-stated monomer mixture. The pressure, which fell once the reaction had begun, was readjusted to 10 to 11 bar by periodically introducing more of the above-stated monomer mixture until it had been completely consumed. After a reaction time of 15 hours, the reaction mixture was cooled to 20° C. and 50 g of an aqueous solution containing 3 wt. % of $NaNO_2$ were added to terminate the reaction. After a further 3 to 5 minutes' stirring, the mixture was degassed and the resultant latex coagulated by freezing or by adding a 2% calcium chloride solution. The mixture was then filtered, the polymer washed with hot water and finally dried at 70° C. and standard pressure (96% yield). According to $^{19}$F-NMR spectroscopy, the product contained the monomers VDF:HFP: 1,1-difluorobromoethylene in proportions of 79.1:20.6:0.3 mol. %. The [η] value was 0.38 dl/g, the Mooney viscosity (at 100° C.) was 91 and the glass transition temperature −22° C.

As described in Example 1, a mixture was produced from the polymer and vulcanized. The specimen exhibited a tensile strength of 16.1 MPa and an elongation at break of 215%. The compression set was 35%.

Example 4

450 g of distilled water, 5 g of $C_3F_7OCF(CF_3)CF_2OCF(CF_3)COONH_4$ as emulsifier and 1.0 g of $(NH_4)_2S_2O_8$ and 0.12 g of Na$_2$S$_2$O as initiator were introduced into an evacuated and argon-flushed reaction vessel of a capacity of 1 liter. A monomer mixture consisting of 64.3 g of VDF, 49.9 g of HFP, 1.1 g of 1,1-difluorobromoethylene, 15.5 g of TFE and 19.2 g of CF$_2$=CF—O—CF$_2$—CF$_2$—(O—CF$_2$)$_2$—O—CF$_3$ in molar proportions of 65.0:21.5:0.5:10.0:3.0 mol. % was then transferred from a storage tank as described in Example 1 to give a pressure of 3 bar. The reaction mixture was heated to 50° C. and the pressure adjusted to 10 to 11 bar by introducing more of the above-stated monomer mixture. The pressure, which fell once the reaction had begun, was readjusted to 10 to 11 bar by periodically introducing more of the above-stated monomer mixture until it had been completely consumed. After a reaction time of 33 hours, the reaction mixture was cooled to 20° C. and 50 g of an aqueous solution containing 3 wt. % of NaNO$_2$ were added to terminate the reaction. After a further 3 to 5 minutes' stirring, the mixture was degassed and the resultant latex coagulated by freezing or by adding a 2% calcium chloride solution. The mixture was then filtered, the polymer washed with hot water and finally dried at 70° C. and standard pressure (94% yield). According to $^{19}$F-NMR spectroscopy, the product contained the monomers VDF:HFP:1,1-difluorobromoethylene:TFE:CF$_2$=CF—O—CF$_2$—CF$_2$—(O—CF$_2$)$_2$—O—CF$_3$ in proportions of 70.0:17.5:0.3:10.0:2.3 mol. %. The [η] value was 0.48 dl/g, the Mooney viscosity (at 100° C.) was 120 and the glass transition temperature −35° C.

As described in Example 1, a mixture was produced from the polymer and vulcanized. The specimen exhibited a tensile strength of 15.0 MPa and an elongation at break of 195%. The compression set was 12%.

Comparative Example 3 (to Example 4)

450 g of distilled water, 2.5 g of C$_3$F$_7$OCF(CF$_3$)CF$_2$OCF(CF$_3$)COONH$_4$ as emulsifier and 1.25 g of (NH$_4$)$_2$S$_2$O$_8$ as initiator were introduced into an evacuated and argon-flushed reaction vessel of a capacity of 1 liter. A monomer mixture consisting of 70.1 g of VDF, 61.9 g of HFP, 1.2 g of 1,1-difluorobromoethylene and 16.8 g of TFE in molar proportions of 65.0:24.5:0.5:10.0 mol. % was then transferred from a storage tank as described in Example 1 to give a pressure of 3 bar. The reaction mixture was heated to 60° C. and the pressure adjusted to 10 to 11 bar by introducing more of the above-stated monomer mixture. The pressure, which fell once the reaction had begun, was readjusted to 10 to 11 bar by periodically introducing more of the above-stated monomer mixture until it had been completely consumed. After a reaction time of 14 hours, the reaction mixture was cooled to 20° C. and 50 g of an aqueous solution containing 3 wt. % of NaNO$_2$ were added to terminate the reaction. After a further 3 to 5 minutes' stirring, the mixture was degassed and the resultant latex coagulated by freezing or by adding a 2% calcium chloride solution. The mixture was then filtered, the polymer washed with hot water and finally dried at 70° C. and standard pressure (94% yield). According to $^{19}$F-NMR spectroscopy, the product contained the monomers VDF:HFP:1,1-difluorobromoethylene:TFE in proportions of 67.3:21.5:0.3:10.9 mol. %. The [η] value was 0.33 dl/g, the Mooney viscosity (at 100° C.) was 68 and the glass transition temperature −17° C.

As described in Example 1, a mixture was produced from the polymer and vulcanized. The specimen exhibited a tensile strength of 13.5 MPa and an elongation at break of 140%. The compression set was 15%.

Interpretation of the results.

The comparative examples illustrate the effect of component d) on the glass transition temperature: it determines the low temperature flexibility. Without component d) (see Comparative Examples 1 and 2 compared with Examples 1 and 3) the glass temperatures are considerably higher than with component d).

In addition, Examples 1 and 2 illustrate in comparison to Comparative Example 1 that the costly fluorinated methyl vinyl ether can be partially or completely replaced by perfluorooxaalkyl vinyl ether, considerably smaller quantities being required in relation to the total mixture.

| Comparative Example | 1 | | | 2 | |
|---|---|---|---|---|---|
| Example | | 1 | 2 | | 3 |
| fluorinated methyl vinyl ether (c) in the product [in mol %] | 22.7 | 19.2 | 20.1 | — | — |
| perfluoro-(polyoxaalkyl vinyl ether) (d) in the product [in mol %] | — | 1.7 | 0.4 | — | 2.3 |
| T$_g$ | −35° C. | −39° C. | −37° C. | 22° C. | −35° C. |

It will be understood that the specification and examples are illustrative but not limitative of the present invention and that other embodiments within the spirit and scope of the invention will suggest themselves to those skilled in the art.

We claim:

1. A peroxide crosslinkable fluororubber having crosslinking-active sites and comprising polymerized units of vinylidene fluoride, optionally tetrafluoroethylene, at least one fluorinated propene or methyl vinyl ether and at least on perfluoro-(polyoxaalkyl vinyl ether), rubber comprising about a) 65–82 mol-% of vinylidene fluoride,
b) 0–12 mol-% of tetrafluoroethylene,
c) 12–23 mol-% of at least one fluorinated propene or fluorinated methyl vinyl ether,
d) 0.3–6 mol-% of at least one perfluoro-(polyoxaalkyl vinyl ether) of the formula (I)

$$CF_2=CF-O-R_F \qquad (I),$$

wherein R$_F$=—(CF$_2$)$_m$(—O—CF$_2$)$_n$—O—CF$_3$ where m=3 and n=0 or m=2 and n=1–4;

of wherein R$_F$=(CF$_2$—CF$_2$—O)$_p$—C$_q$F$_{2q+1}$ where p=1–4 and q=1 or 2, and e) 0.1–1.0 mol-% of crosslinking-active reactive sites.

2. A peroxide crosslinkable fluororubber according to claim 1, comprising about a) 70–82 mol-% of vinylidene fluoride,
b) 0–12 mol-% of tetrafluoroethylene,
c) 16.23 mol-% of at least one fluorinated methyl vinyl ether,
d) 0.3–5 mol-% of at least one perfluoro-(polyoxaalkyl vinyl ether) of the formula (I)

$$CF_2=CF-O-R_F \qquad (I),$$

wherein R$_F$=(CF$_2$)$_m$(O—CF$_2$)$_n$—O—CF$_3$ where m=3 and n=0 or m=2 and n=1–4;

or wherein R$_F$=—(CF$_2$—CF$_2$—O)$_p$—CF$_3$ where p=1–4, and e) 0.1–1.0 mol-% of crosslinking-active reactive sites.

3. A peroxide crosslinkable fluororubber according to claim 1, comprising about
a) 65–82 mol-% of vinylidene fluoride,
b) 0–12 mol-% of tetrafluoroethylene,
c) 12–20 mol-% of at least one fluorinated propene,
d) 1–6 mol-% of at least one perfluoro-(polyoxaalkyl vinyl ether) of the formula (I)

$$CF_2=CF-O-R_F \qquad (I)$$

wherein $R_F=-(CF_2)_m(-O-CF_2)_n-O-CF_3$ where m=3 and n=0 or m=2 and n=1–4;

or wherein $R_F=-(CF_2-CF_2-O)_p-CF_3$ where p=1–4, and e) 0.1–1.0 mol-% of crosslinking-active reactive sites.

4. A peroxide crosslinkable fluororubber according to claim 1, wherein d) is perfluoro-(polyoxaalkyl vinyl ether) of the formula (I) where $R_F=-(CF_2)_m(-O-CF_2)_n-O-CF_3$, m=2 and n=1–4.

5. A peroxide crosslinkable fluororubber according to claim 1, wherein d) is perfluoro-(polyoxaalkyl vinyl ether) of the formula (I) where $R_F=-(CF_2CF_2-O)_m-CF_3$ and m=1–4.

6. A peroxide crosslinkable fluororubber according to claim 1, wherein c) is at least one compound selected from the group consisting of hexafluoropropene, pentafluoropropene and perfluoromethyl vinyl ether.

7. A peroxide crosslinkable fluororubber according to claim 1, wherein e) comprises at least one of C=C double bonds, bromine and iodine residues.

8. A process for the preparation of peroxide crosslinkable fluororubber according to claim 1, which comprises free-radically copolymerizing components a), c), d) and e), and optionally b) if desired in the end product, in solution, suspension or emulsion at from about 0° to 120° C. under elevated pressure.

9. A process for the preparation of a peroxide crosslinkable fluororubber according to claim 1, which comprises free-radically copolymerizing components a), c), d) and e), and optionally b) if desired in the end product in an aqueous dispersion in the presence of a perfluorinated emulsifier with a free initiator system at a temperature of about 20° to 80° C. under elevated pressure of ≧=2 bar.

10. A molded rubber article produced by the process of claim 8.

* * * * *